(12) United States Patent
Abell et al.

(10) Patent No.: US 8,757,469 B2
(45) Date of Patent: Jun. 24, 2014

(54) BINARY CLASSIFICATION OF ITEMS OF INTEREST IN A REPEATABLE PROCESS

(71) Applicant: GM Global Technology Operations LLC, Detroit, MI (US)

(72) Inventors: Jeffrey A Abell, Rochester Hills, MI (US); John Patrick Spicer, Plymouth, MI (US); Michael Anthony Wincek, Rochester, MI (US); Hui Wang, Highland, MI (US); Debejyo Chakraborty, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/632,670

(22) Filed: Oct. 1, 2012

(65) Prior Publication Data

US 2013/0105556 A1    May 2, 2013

Related U.S. Application Data

(60) Provisional application No. 61/551,665, filed on Oct. 26, 2011.

(51) Int. Cl.

| | | |
|---|---|---|
| *B23K 1/06* | (2006.01) | |
| *B23K 5/20* | (2006.01) | |
| *B23K 20/00* | (2006.01) | |
| *B23K 20/10* | (2006.01) | |
| *G05B 11/00* | (2006.01) | |
| *G05B 11/06* | (2006.01) | |
| *B23K 20/12* | (2006.01) | |
| *G05B 1/00* | (2006.01) | |
| *G05B 1/01* | (2006.01) | |
| *G05B 1/04* | (2006.01) | |
| *G05B 11/01* | (2006.01) | |
| *G05B 19/00* | (2006.01) | |
| *G05B 19/02* | (2006.01) | |
| *G05B 19/04* | (2006.01) | |
| *G05B 19/18* | (2006.01) | |

(52) U.S. Cl.
CPC ............... *B23K 20/10* (2013.01); *B23K 20/106* (2013.01); *B23K 20/12* (2013.01); *G05B 1/00* (2013.01); *G05B 1/01* (2013.01); *G05B 1/04* (2013.01); *G05B 11/00* (2013.01); *G05B 11/01* (2013.01); *G05B 11/011* (2013.01); *G05B 19/00* (2013.01); *G05B 19/02* (2013.01); *G05B 19/04* (2013.01); *G05B 19/18* (2013.01)
USPC ........ 228/110.1; 228/102; 228/103; 228/104; 228/111; 228/1.1; 700/28; 700/29; 700/30; 700/31; 700/59; 700/212

(58) Field of Classification Search
CPC ...... B23K 20/10; B23K 20/12; B23K 20/106; G05B 1/00; G05B 1/01; G05B 1/04; G05B 11/00; G05B 11/01; G05B 11/011; G05B 19/00; G05B 19/02; G05B 19/04; G05B 19/18
USPC ............... 228/102, 103, 104, 110.1, 111, 1.1; 700/28, 29, 30, 31, 59, 212
See application file for complete search history.

(56) References Cited

U.S. PATENT DOCUMENTS

2011/0108181 A1*   5/2011   Cai et al. .................. 156/64

*Primary Examiner* — Erin Saad
(74) *Attorney, Agent, or Firm* — Quinn Law Group, PLLC

(57) ABSTRACT

A system includes host and learning machines in electrical communication with sensors positioned with respect to an item of interest, e.g., a weld, and memory. The host executes instructions from memory to predict a binary quality status of the item. The learning machine receives signals from the sensor(s), identifies candidate features, and extracts features from the candidates that are more predictive of the binary quality status relative to other candidate features. The learning machine maps the extracted features to a dimensional space that includes most of the items from a passing binary class and excludes all or most of the items from a failing binary class. The host also compares the received signals for a subsequent item of interest to the dimensional space to thereby predict, in real time, the binary quality status of the subsequent item of interest.

13 Claims, 6 Drawing Sheets

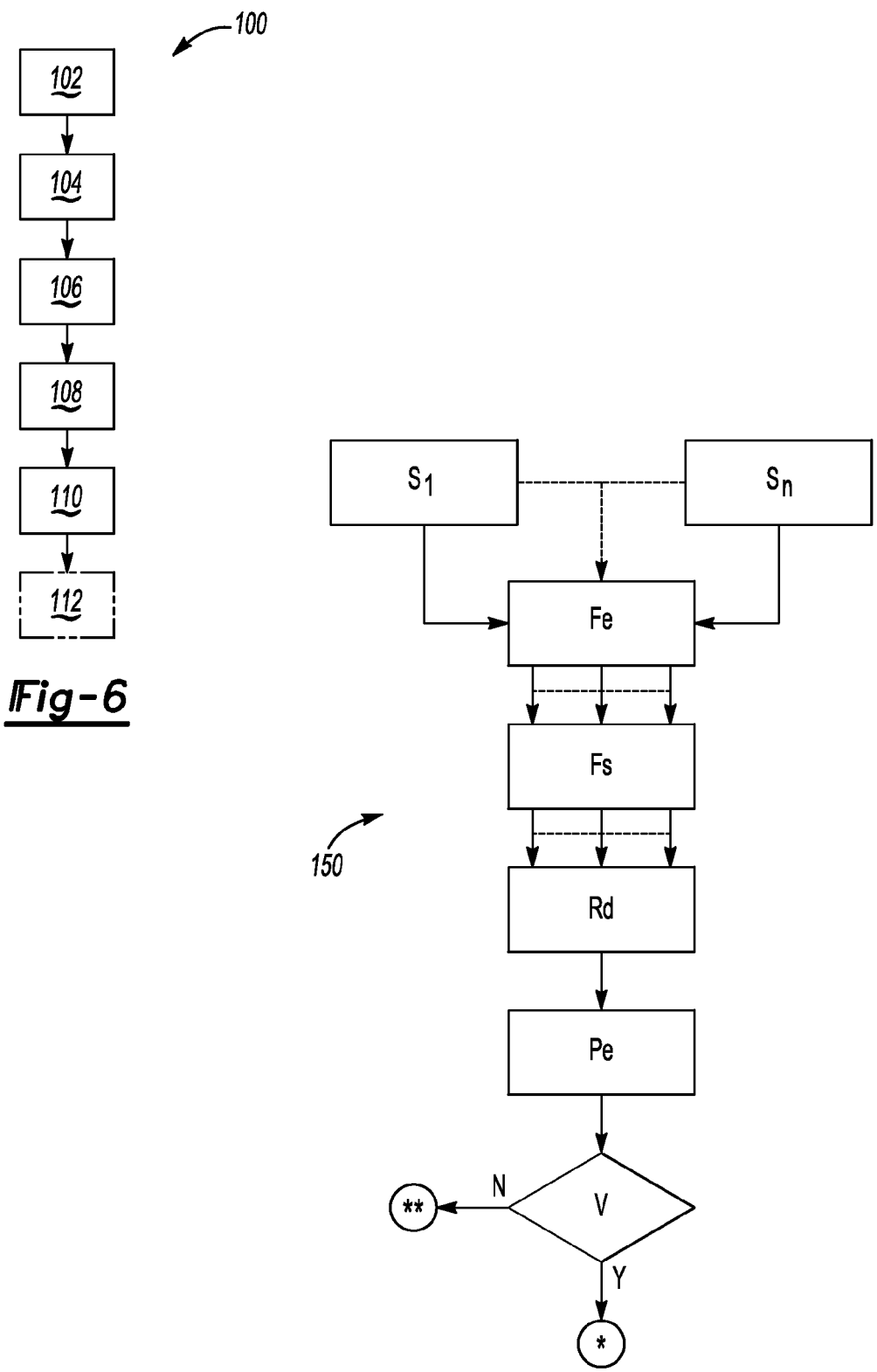

BINARY CLASSIFICATION OF ITEMS OF INTEREST IN A REPEATABLE PROCESS

CROSS-REFERENCE TO RELATED APPLICATIONS

This application claims the benefit of U.S. Provisional Application Ser. No. 61/551,665, which was filed on Oct. 26, 2011, and which is hereby incorporated by reference in its entirety.

STATEMENT REGARDING FEDERALLY SPONSORED RESEARCH OR DEVELOPMENT

This invention was made with U.S. Government support under an Agreement/Project DE-EE0002217, Department of Energy Recovery and Reinvestment Act of 2009, Battery Pack Manufacturing B511. The U.S. government may have certain rights in this invention.

TECHNICAL FIELD

The present disclosure relates to the binary classification of items of interest in a repeatable process.

BACKGROUND

Various processes are repeatable, and thus lend themselves to real time process monitoring. An example of such a repeatable process is vibration welding, which involves the controlled application of high frequency vibration energy to a clamped work piece. Surface friction generates heat at a weld interface, which ultimately softens and bonds adjacent work piece surfaces at the interface. For a given work piece, the formation of each weld is often performed in a consistent, repeatable manner.

Conventional process control methods for repeatable processes monitor fixed variables against calibrated thresholds. That is, various closed-loop parameter-based control techniques may be applied to maintain certain weld parameters within calibrated limits. This approach can produce reasonably consistent welding parameters over time. However, stable welding process parameters may still fail to produce welds of a consistently high quality. In addition, external factors such as material quality can also impact weld quality. A premature failure of just one weld can affect the performance of a welded system. It is therefore common practice to determine weld integrity by visual inspection of each weld, followed by a labor intensive process known as picking, wherein each of the formed welds is physically tested by an operator using a picking tool.

SUMMARY

A system and method are disclosed herein for predicting the binary quality status of an item of interest in a repeatable process, i.e., a classification into one of just two states such as 0 or 1, good or bad, passing or failing, etc. Such a process is described herein using the example of vibration welding, with an item of interest in the form of a weld, although the approach may be used in any suitably repeatable process. A work piece whose manufacturing process may be enhanced by use of the present binary classification approach is a multi-cell battery module having a series of welded battery cell tabs. Such a battery module may be configured for use as a power source, e.g., for an electric traction motor aboard an electric, hybrid electric, or extended-range electric vehicle. While the present approach is not limited to weld process monitoring of battery cell tabs, the battery module described herein is representative of the type of system in which the present invention may have particular utility. Therefore, an example battery module is used throughout the remainder of this disclosure for illustrative consistency.

In particular, a system is disclosed herein that, in one configuration, includes a host machine, a learning machine, and sufficient memory. The host and learning machines each includes a processor in electrical communication with one or more sensors positioned with respect to an item of interest. The item of interest may be, as noted above, a weld formed during the example vibration welding process. Instructions for predicting a binary quality status of the item of interest are recorded via the memory. The binary quality status or state may include a passing and a failing binary class, e.g., 0 or 1, such that the item of interest is either passing or failing and has no other status or class.

The learning machine may execute the instructions via the processor to thereby receive signals from the sensor(s), and, in one possible embodiment, to extract a set of candidate features from the received signals. In another embodiment, candidate features may be determined manually and provided to the learning machine and/or the host machine. A set of features may be extracted from the candidate features that are more predictive of the binary quality status of the item of interest relative to the other candidate features.

The extracted features are mapped, via one of the machines, to a dimensional space that includes most of the items of interest from the passing binary class and excludes all or most, i.e., substantially all of, the items of interest from the failing binary class. As used herein, "substantially all" may mean at least about 90%, at least 95%, and at least 99% in three different embodiments. While percentages less than 90% may be used without departing from the intended scope, performance may be affected adversely too far below 90%. The dimensional space is referred to herein as a box or a box-void. The host machine compares the received signals for a subsequent item of interest, e.g., a weld formed in a subsequent welding process, to the dimensional space to predict, in real time, the binary quality status of the subsequent item of interest.

Another example system includes a welding horn and an anvil positioned adjacent to the welding horn. The welding horn clamps against the anvil and forms a weld on a work piece during a repeatable vibration welding process. The system also includes a plurality of sensors positioned with respect to the welding horn, and a host machine and learning machine each having a processor in electrical communication with the sensors. The machines are configured as noted above.

A method is also disclosed that includes receiving, during a vibration welding process, a set of sensory signals from a plurality of sensors positioned with respect to a work piece during formation of a vibration welded joint. The signals are measurements obtained at equally spaced points in time for a finite duration. The method further includes receiving control signals from a welding controller during the vibration welding process, with the control signals causing the welding horn to vibrate at a calibrated frequency. Additionally, the method includes processing the received sensory and control signals, including extracting a predetermined number of features from a set of candidate features, and mapping the predetermined number of features to a dimensional space, which may have a number of dimensions that is proportional to the predetermined number.

As part of the method, the host machine may predict the binary quality status of each of the welds in real time using the extracted features, for each weld, and by comparing the extracted features to the dimensional space, wherein an extracted feature falling within and outside of the dimensional space is assigned a failing and a passing binary classification, respectively. The method may include displaying the predicted binary quality status, for example on or adjacent to the welds themselves.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 6 is a flow chart describing an example method for monitoring and indicating weld quality in a vibration welding process.

FIG. 7 is a flow chart describing off-line learning as part of the method shown in FIG. 6.

DETAILED DESCRIPTION

Figure 1:
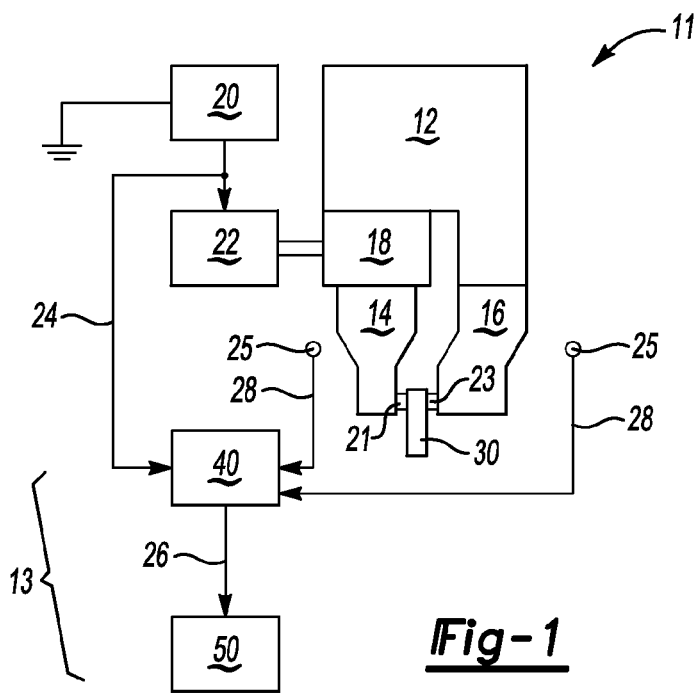
FIG. 1 is a schematic illustration of an example automated monitoring system for an example repeatable vibration welding process.

Referring to the drawings, wherein like reference numbers refer to like components throughout the several Figures, an example vibration welding system 11 is shown schematically in FIG. 1. The vibration welding system 11 includes a welding assembly 12 and a monitoring system 13. The monitoring system 13 takes advantage of a binary classification method, which is referred to hereinafter as a box-void method 100, to classify a weld into one of two quality states, e.g., 1 or 0, good or bad, passing or failing, etc. An example of the binary classification approach is described in detail below with reference to FIGS. 4A-9.

Figure 8:
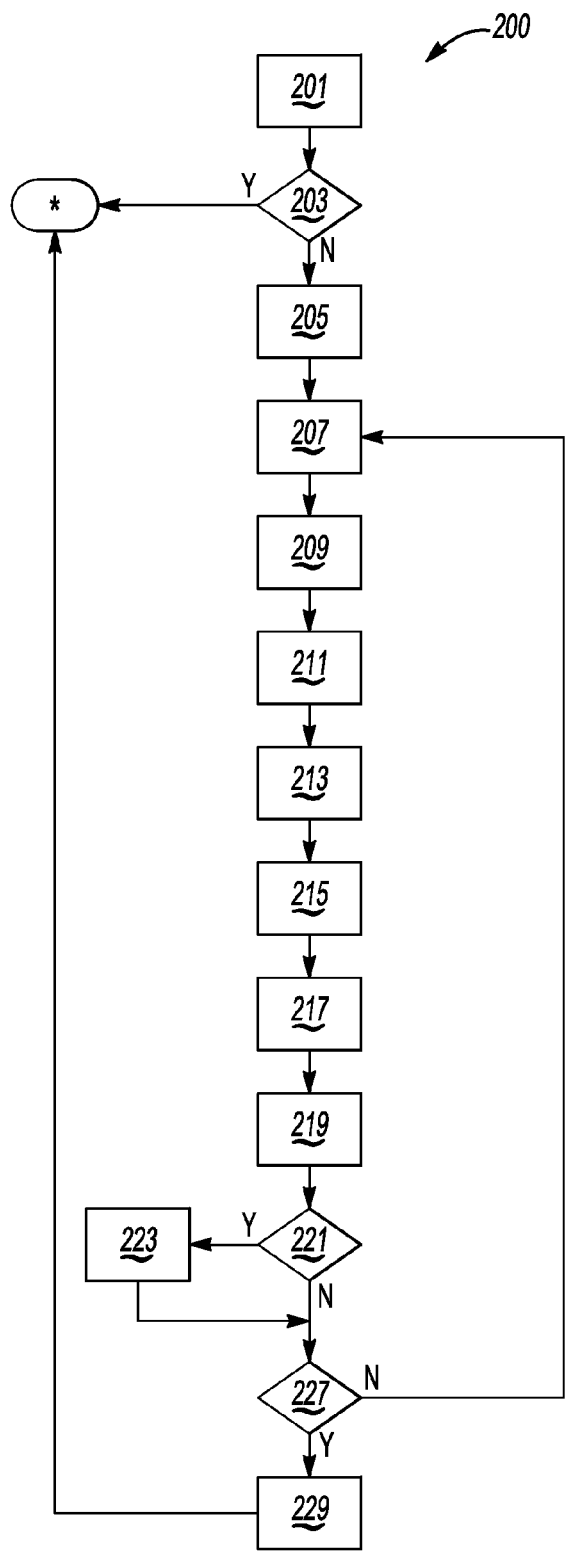
FIG. 8 is a flow chart describing a method for creating a rule matrix that may be used as part of the method of FIG. 7.

In the execution of the method 100, as well as related subprocesses 150 and 200 as shown in FIGS. 7 and 8, respectively, hardware components process recorded code so as to automatically and rapidly identify features of interest, hereinafter referred to simply as "features", which can be used for real-time process monitoring, and also to set the allowed limits on each of the identified features. The present approach may also be used to automatically identify the features themselves. Use of the monitoring system 13 may improve production quality by substantially eliminating instances of "false passes" during a vibration welding process, i.e., the incorrect decision of declaring a bad item as being good, i.e., a false accept or Type II statistical error. The method 100 also improves production efficiency by having a low Type I error (i.e., false alarm) rate, with fewer manual inspections when the Type I error rate is lower. That is, in statistical hypothesis tests, there are two well-defined terms: type I errors and type II errors. These terms respectively refer to two types of mistakes made when a true null hypothesis is incorrectly rejected (type I error) and where one fails to reject a false null hypothesis (type II error). The method 100 reduces the need for direct manual inspection or picking of every weld in a completed assembly. Those of ordinary skill in the art will appreciate that the method 100 may be used to classify any raw set of items into one of two classes. The example of the welding system 11 of FIG. 1 is used hereinafter for illustrative consistency.

The welding assembly 12 includes a sonotrode/welding horn 14 and a welding anvil 16, along with other welding tools and components as described below. The monitoring system 13 is configured to monitor various control signals provided by a power supply/welding controller 20 and/or measured by one or more sensors 25 positioned with respect to the welding apparatus 12. The monitoring system 13 can predict, online and in real time, whether the welding assembly 12 has produced an objectively passing/good weld or an unsatisfactory or suspected bad/suspect weld. The suspect welds may then be subjected to direct end-of-line inspection such as manual picking or other direct or indirect testing of the weld to verify the presence of and isolate any unsatisfactory/bad welds. Any verified bad welds may be optionally marked and imaged as explained below with reference to FIG. 3. Data from the bad welds may be fed back to the learning machine 140 described herein to improve the performance of the monitoring system 13.

As will be understood by those of ordinary skill in the art, a welding controller/power supply used for vibration welding, such as the welding controller 20 of FIG. 1, may be electrically-connected to a suitable energy source, typically a 50-60 Hz wall socket. The welding controller 20 may include, for example, voltage rectifiers, transformers, power inverters, and/or other hardware which ultimately transforms the source power, whatever its form, into vibration control signals (arrow 24). The control signals (arrow 24) ultimately command predetermined waveform characteristic(s), for example a periodic signal having a frequency of about 20 kHz to about 40 kHz or more depending on the particular welding application. Other process information may be included in the control signals (arrow 24), including but not limited to power traces, displacement of the horn 14, vibration frequency, trigger signals, parameter limit alarms, weld controller fault information, etc., as is well understood in the art.

Still referring to FIG. 1, the welding system 11 may include a converter 22 having mechanical structure sufficient for producing a mechanical vibration of the horn 14 in response to the control signals (arrow 24). The horn 14 typically includes a knurl pattern 21, typically bumps and/or ridges, which are suitable for gripping and holding the work piece 30 when the work piece 30 is clamped between the horn 14 and the anvil 16. The anvil 16 typically includes a similar knurl pattern 23. The welding system 11 of FIG. 1 may also include a booster 18, i.e., an amplifier, which increases the amplitude of any commanded mechanical vibration from the welding controller 20 as needed.

Within the monitoring system 13 of FIG. 1, a host machine 40 receives various signals from the sensors 25, which are positioned with respect to the welding assembly 12. The specific functionality and structure of the host machine 40 is described in greater detail below with reference to FIG. 3. In general, the host machine 40 is embodied as one or more computer devices in electrical communication with the welding controller 20. The host machine 40 is continuously apprised, via receipt of the control signals (arrow 24), of instantaneous values of any waveforms transmitted to the horn 14 by the welding controller 20, as well as of other values known by or internal to the welding controller 20.

The sensor(s) 25 is/are "external" with respect to the internally-generated control signals (arrow 24) from the welding controller 20, and therefore the sensors 25 are referred to hereinafter as the external sensors 25. The host machine 40 shown in FIG. 1 thus receives a set of external signals (arrows 28) from the external sensors 25 and internal control signals (arrow 24) from the welding controller 20. The host machine 40 then processes these signals (arrows 24, 28) as part of execution of the box-void method 100 to predict, in real time, the quality of the weld being formed. The predicted weld quality may be provided as an output value (arrow 26) to the optional status projector 50, whereupon the predicted quality of a given weld may be visually indicated, e.g., via direct projection of a beam of light onto the work piece 30.

Figure 2:
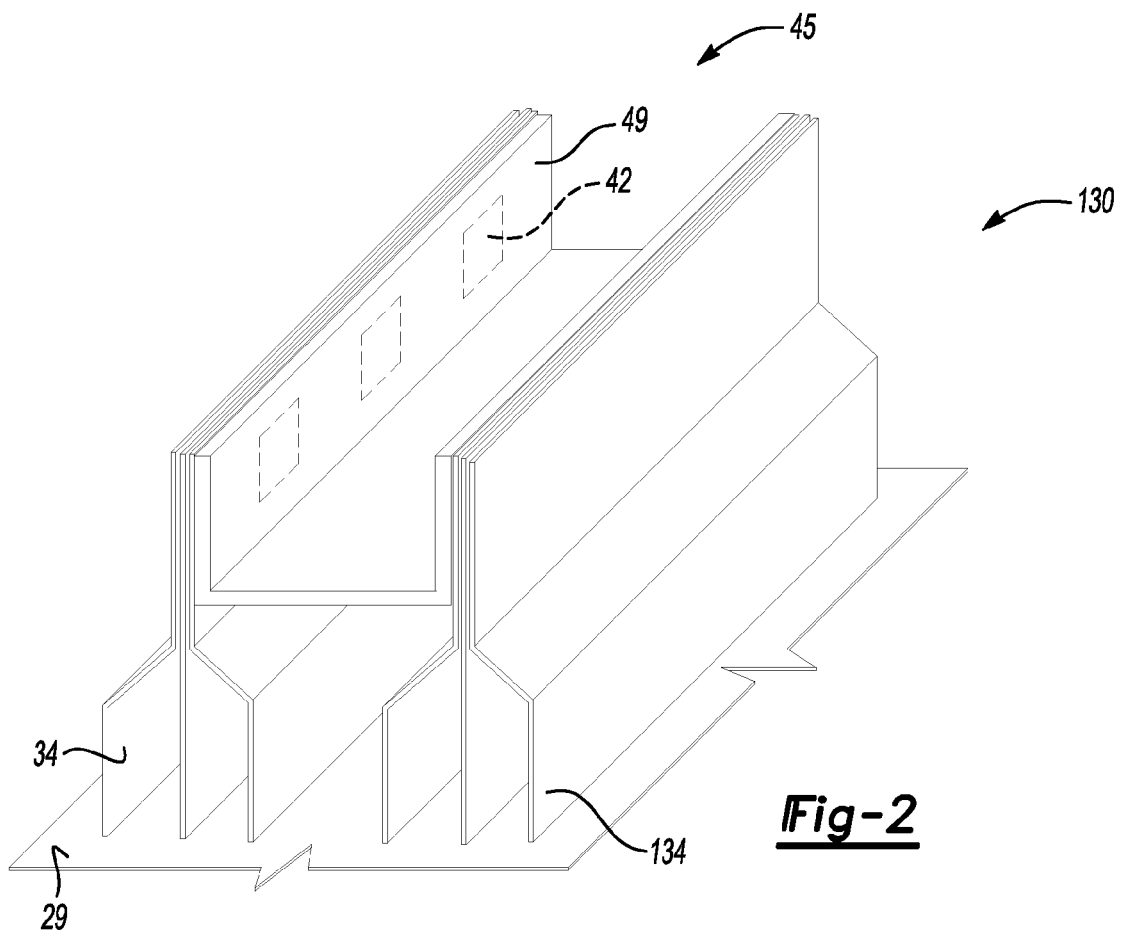
FIG. 2 is a schematic perspective view illustration of a portion of an example multi-cell battery module having welds as items of interest whose binary quality may be monitored and predicted in real-time using the system shown in FIG. 1.

Referring to FIG. 2, in a non-limiting example embodiment the work piece 30 shown in FIG. 1 may be configured as a multi-cell battery module 130 having an elongated conductive interconnecting member 45. For illustrative simplicity, only a portion of the battery module 130 is shown, however the battery module 130 as a whole may include an extended series of interconnecting members 45 arranged side by side in one or more rows. Each interconnecting member 45 joins oppositely-charged battery cell tabs 34, 134, of adjacent battery cells, with the battery cell tabs 34, 134 forming individual electrode extensions of a given battery cell.

Each cell tab 34, 134 is internally-welded, below an interconnect board 29 of the battery module 130, to the various anodes or cathodes comprising that particular battery cell, as is well understood by those of ordinary skill in the art. Multiple battery modules 130 may be arranged to form a complete battery pack of the type used to power an electric traction motor in a vehicle, or in other relatively high-power applications. The interconnecting member 45 may be constructed of a suitable conductive material, e.g., copper and/or aluminum, or at least partially nickel, to form a conductive rail for completing an electric circuit. Each interconnecting member 45 is positioned adjacent to the interconnect board 29 of the battery module 130, or formed integrally therewith.

The battery cell tabs 34, 134 extending from the interconnect board 29 may be ultrasonically welded to a longitudinal side wall 49 of a given interconnecting member 45, with substantially identical welds 42 formed at each interconnecting member 45 that is used in constructing the overall battery module 130. The high number of outwardly identical welds 42, e.g., on a series of substantially identical interconnecting members 45, is a structural feature that may be monitored effectively using the system 11.

Figure 3:
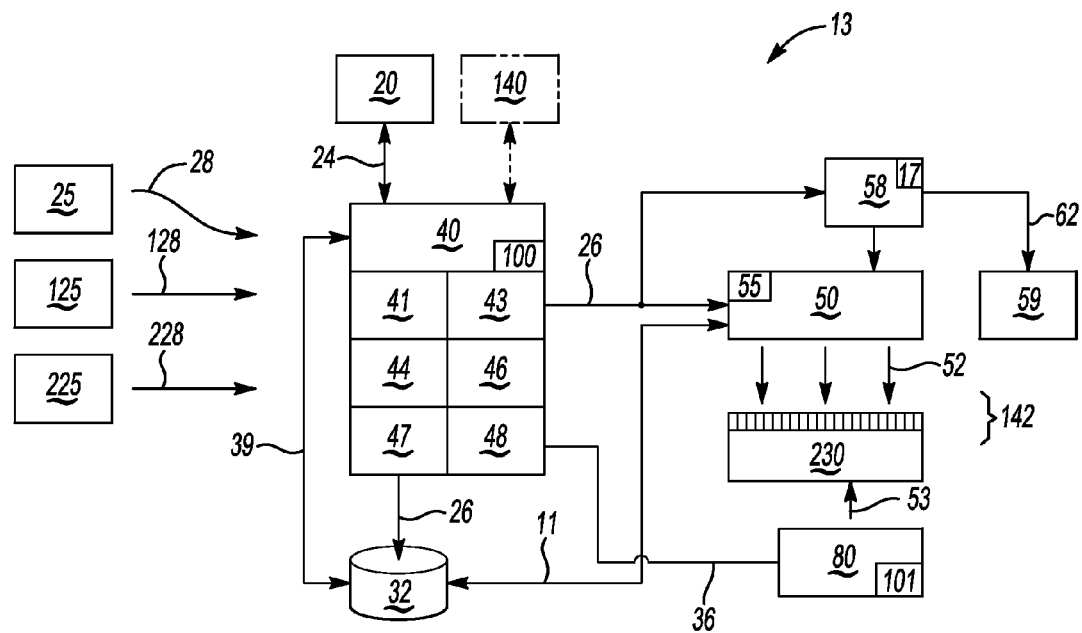
FIG. 3 is a schematic illustration of a system that may be used to predict the weld quality in a vibration welding system in the manner set forth herein.

Referring to FIG. 3, the present monitoring system 13 of FIG. 1 is described in greater detail. The monitoring system 13 may be used for predicting weld quality in a work piece 230, e.g., a multi-cell battery pack having an extended weld series 142 of outwardly identical welds. The host machine 40 may include a microprocessor or CPU 47 and a tangible, non-transitory memory device 48. The memory device 48 may include any required read only memory (ROM), flash, optical, and/or other non-transitory memory. The host machine 40 may also include transitory memory, e.g., any required random access memory (RAM), electrically-programmable read-only memory (EPROM), etc.

The host machine 40 may also include additional circuitry such as a high-speed clock (not shown), analog-to-digital circuitry, digital-to-analog circuitry, a digital signal processor, and the necessary input/output devices and other signal conditioning and/or buffer circuitry. The host machine 40 thus provides the necessary hardware components needed to execute process instructions embodying the present box-void method 100 from the memory device 48.

The host machine 40 of FIG. 3 may receive the control signals (arrow 24) from the welding controller 20 and other signals (arrows 28, 128, 228) from the external sensors 25, 125, and 225, respectively. As part of the control signals (arrow 24), the welding controller 20 may provide certain data that may be used by the host machine 40 and/or the learning machine 140 to determine historical information such as welding power over time, welding frequency over time, and other possible waveforms or values, as well as peak values, slopes, areas, area ratios, moving averages, and the like.

In an example embodiment, one external sensor 25 may be configured as an acoustic sensor, for instance a microphone or an acoustic emission sensor positioned in direct contact with a surface of a welding tool, e.g., the horn 14 of FIG. 1. The external sensor(s) 25 may measure the acoustic frequency of the vibrating horn 14 of FIG. 1 over time, with this value used by the host machine 40 as a base signal from which features may be extracted and modeled. Another example external sensor 125 may measure a changing linear displacement of the horn 14 of FIG. 1 over time. Yet another example external sensor 225 may be used to detect any other desirable value, such as changing welding temperature and/or other atmospheric information such as relative humidity that might affect weld quality. Each external sensor 25, 125, 225 may include one or more individual sensors as noted above.

The host machine 40 shown schematically in FIG. 3 may include, for any computer devices used in the real-time monitoring of a repeatable process, a recorded feature library 41, i.e., a recorded database of previously identified features and their boundaries, as defined in offline learning portions of the box-void method 100. A preliminary set of "candidate" features may be provided to the host machine 40, for instance extracted, calculated, or otherwise derived offline. Derivation may be conducted, for example, as a function of the base power, frequency, displacement, and/or acoustic signals provided from the welding controller 20 and/or from the various external sensors 25, 125, or 225. The features may be mapped via execution of the method 100 and subprocess 150 and 200 as set forth below, and/or some or all of the extracted features may be optionally combined, so as to form other candidate features which, if selected as being optimal features, can be used to define the box-void for use in process monitoring.

Some non-limiting example candidate features include total welding energy, i.e., the area under a power curve or primary welding frequency commanded from the welding controller 20. Other candidate features may include the elapsed time in forming a given weld in the weld series 142, peak power, rise time, ramp rate, or even correlation data, for instance between a reference signal and the welding signal. Any number of desired features may be identified or extracted and then used in real-time process monitoring without departing from the intended inventive scope. However, as explained below, an increased number of features results in a box-void having a larger dimensional space, thus requiring more processing power.

The host machine 40 shown in FIG. 3 may also include a mapping module 43. The mapping module 43, which may reside in a separate/off-line computer device referred to hereinafter as a learning machine 140, includes computer-executable instructions, which are executable via the CPU 47, for identifying the best/optimal subset of candidate features that most accurately predicts a good weld or other item of interest. The mapping module 43 may also determine suitable upper and/or lower limits for any monitored features. One possible approach for this is described below with reference to FIG. 8.

The monitoring system 13 of FIG. 1 may include a display 59 and the status projector 50 noted above. The status projector 50 interacts with the host machine 40 and the work piece 230 by optionally illuminating any suspect welds, as indicated by arrows 52. For instance, the status projector 50 may optionally highlight good welds. Such highlighting may be performed directly on the weld itself or on another surface of the work piece 230, for instance immediately adjacent to the weld such as on the interconnecting member 45, upon formation of the welds.

Figure 4A:
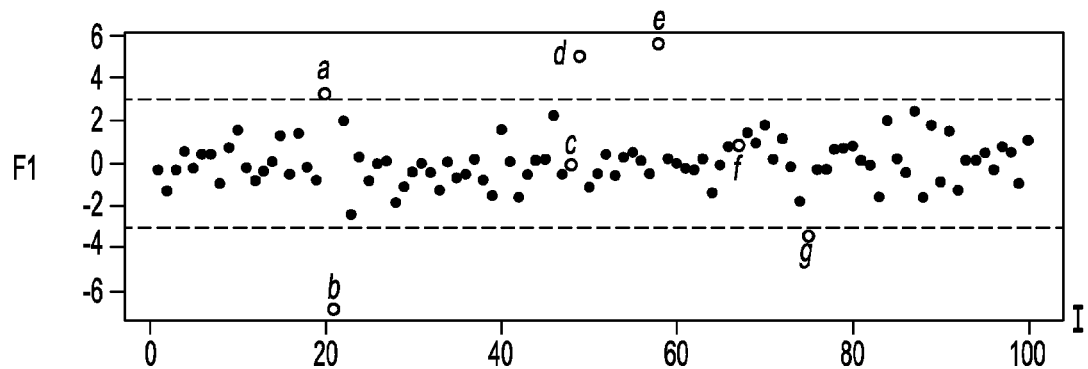
FIG. 4A is an example time plot for an example feature.
Figure 4B:
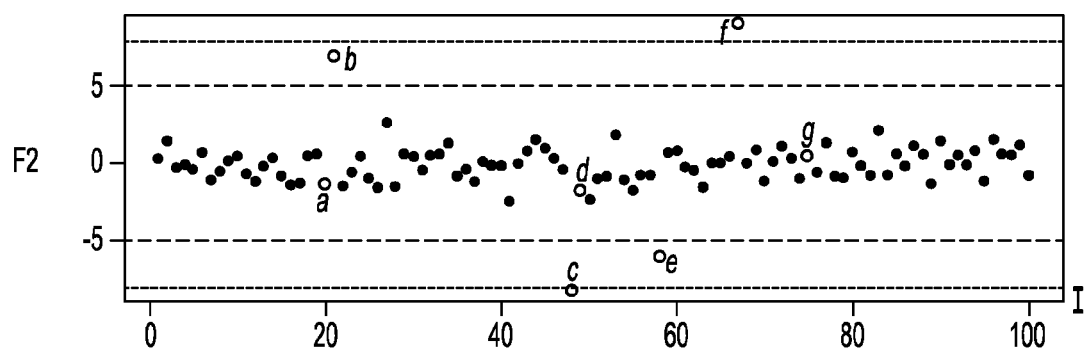
FIG. 4B is another time series plot for another example feature.
Figure 4C:
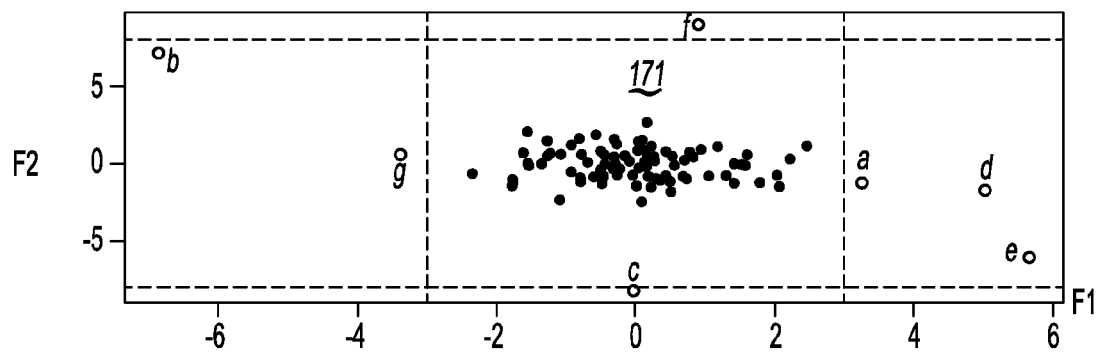
FIG. 4C is a scatterplot for the example time series plots shown in FIGS. 4A and 4B.

Referring to FIGS. 4A and 4B, example time series plots are shown for two different features F1 and F2, with time represented on the horizontal axis and the value of the feature, e.g., amplitude, temperature, slope, etc., represented on the vertical axis. In an example embodiment, the host machine 40 or learning machine 140 receives or automatically extracts a preliminary set of (n) candidate features and then maps a smaller subset (m) of features, or alternatively identifies a feature which is determined as a function of one or more candidate features, to a dimensional space having demarcated pass/suspect boundaries. This is shown in FIG. 4C. The host machine 40 then predicts, in real-time, the weld quality of the weld from the box-void of the resultant map.

The "box" defining the void in the present box-void method 100 is an orthotype that has a specific shape and orientation. The sides of the box are either parallel to or orthogonal to the axes in a standard orthogonal coordinate system, e.g., the x and y axes in a two-axis coordinate system. Equivalently, the sides of the box are aligned with the standard orthogonal axes. In two dimensions the box is a rectangle while in three dimensions the box is a rectangular parallelepiped, and in both cases the sides are aligned with the standard orthogonal axes. Thus, the term "box" as used herein refers to any orthotype whose sides are aligned with the standard orthogonal axes.

The host machine 40 and/or the learning machine 140 as described above executes all or portions of the box-void method 100 to determine the dimensional space or largest "box void" that encompasses most of the good welds and excludes all or substantially all, e.g., at least 90%, of the bad welds. Once the void has been defined, the size of the void may be adjusted via the host machine 40 or learning machine 140 in order to add a margin of safety for detecting bad welds, and to thus ensure a low or zero Type II error rate. For instance, the host machine 40 and/or the learning machine 140 may be programmed for tightening the limits on the features and/or by increasing the number of features, which may result in a slight increase in the Type I error rate but otherwise can provide acceptable results. Alternatively, the void may increase in size to allow for a certain amount of Type II error while further reducing the Type I error rate, e.g., by loosening the limits on the features and/or by reducing the number of features that are monitored. Adjustment may be determined as a function of the error rate in one embodiment.

The present method 100 can be used to identify features for use in subsequent repeatable process monitoring, i.e., a process that is performed in the same sequence and manner, repetitively, and thus lends itself to binary classification. Aspects of the method 100 can be used to set the corresponding limits on each identified feature. The number of dimensions defining the box-void is not more than the number of candidate features, and is typically a much smaller number.

For instance, FIG. 4A shows a collection of example data points, with each data point representing a measurement of the indicated feature, for instance a peak power measurement. Data points a-g correspond to welds having a true binary state of 1, with this status or binary class being represented in FIGS. 4A-C as empty circles. Group 0 binary states are all of the unlabeled points. Any point failing outside the limits of the feature are said to have "failed" the test. The true states may be determined offline, e.g., via physical inspection and verification. The learning machine 140 must be provided with the true states of each item.

Feature F1, with its boundaries, correctly detects five group 1 items, i.e., a, b, d, e, and g, but does not correctly detect two items, i.e., items c and f. FIG. 4B shows another collection of example normalized data points for a different feature, e.g., rise time, with a different set of corresponding limits. Here, feature F2 correctly identifies four group 1 items, i.e., b, c, e, and f, but does not correctly identify the remaining group 1 items a, d, and g.

FIG. 4C combines the information of the time series plots of FIGS. 4A and 4B into a scatterplot using the present box-void method 100. The host machine 40 of FIGS. 1 and 3, or the learning machine 140, automatically defines a box 171 that excludes all of the failing data points a-f. In this manner, the box 171 that is created is devoid of group 1 points, i.e., a "box-void" is created. Note that the number of dimensions of the box equals the number of features in this example. All seven group 1 points are excluded from the void.

Box-Void Methodology

The present approach proceeds in two stages: box-void learning, which may occur offline via the learning machine 140, and box-void execution, the latter of which occurs in real time during a repeatable process. Suppose that for each of N items, e.g., welds, a number of signals are observed from which n candidate features are extracted. Each item is in one of two states or groups, such as 0 and 1, and the item's true state is known. A goal of the method 100 is to infer a classifier or rule from the above information that can be used to predict the state of a future item for which the feature values are observed but the state is not.

A "rule" as used herein is recorded in a rule matrix where the rows, each of which correspond to one of the features, contain the lower and/or upper boundaries which are used to predict the state of an item. An item for which any of its features in the rule has a value less than or equal to the lower boundary or greater than or equal to the upper boundary is said to be in the state or binary class having a label of 1. Otherwise, the item is in binary class having a label of 0.

The term F represents a feature matrix, and may be defined as an N×n matrix of n candidate features for each of the N items of interest, e.g., individual welds, and l as the corresponding N vector of known states (0 or 1). Hence, the $j^{th}$ column of F contains the data for the $j^{th}$ feature. The present box-void method 100 may use the feature matrix, F, and the known states, l, to create a rule matrix by finding a subset of features and corresponding bounds. The method 100 works on the assumption that a large percentage of items are in the binary state of 0, and that items in a binary state of 1 will manifest themselves as outliers in distributions of certain features. Thus, a goal of the method 100 is to find those features and the corresponding bounds for those features, a goal which is satisfied by iteratively finding the features and bounds for which state 1 items are the most outlying.

For instance, to accomplish this goal for a given data set, a group 1 ordered run is defined as a subset of ordered values with the same label 1, which is immediately preceded and immediately succeeded by no data or by data with the label 0. Consider the following data sets A, B, and C:

| Data Set | A | | | | B | | | | C | | | | | |
|---|---|---|---|---|---|---|---|---|---|---|---|---|---|---|
| values | 1 | 3 | 6 | 20 | 1 | 3 | 6 | 20 | 1 | 3 | 3 | 6 | 20 | 22 |
| labels | 0 | 1 | 1 | 0 | 1 | 0 | 1 | 1 | 0 | 0 | 1 | 1 | 1 | 0 |
| group 1 runs | | 3 | 6 | | 1 | | 6 | 20 | | | 3 | 6 | 20 | |

In data set A, {3, 6} is an ordered run. In data set B, {1} is the first group 1 ordered run and {6, 20} is the last. Note that in data set C, the value 3 has two labels and it is part of the group 1 ordered run {3, 6, 20}. The statistical concepts underlying execution of the box-void method 100 are further explained below with reference to the flow chart of FIG. 8.

Figure 5:
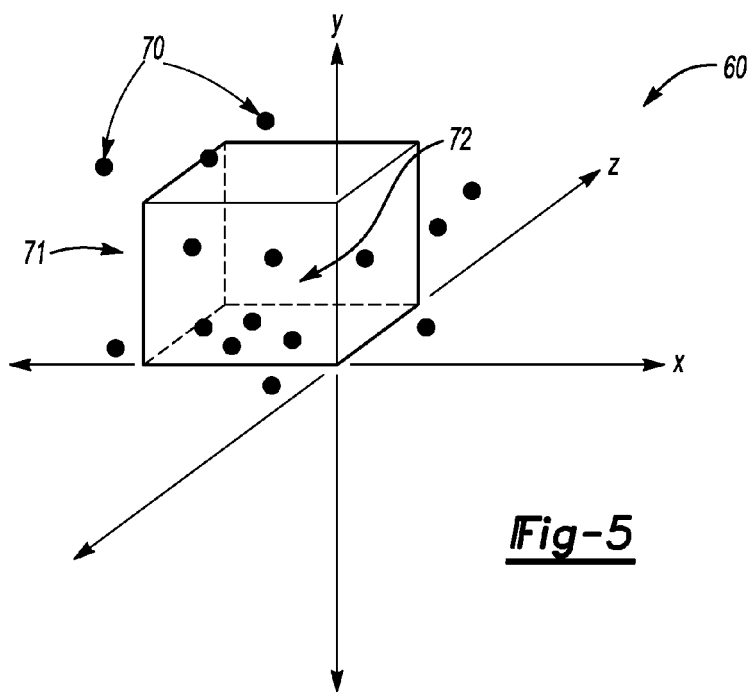
FIG. 5 is a diagram of a mapped set of extracted features in three dimensions.

Referring to FIG. 5, an example m-dimensional space 60 is shown as a simplified illustrative embodiment of an output generated, via the box-void method 100 explained above, using the mapping module 43 that is shown schematically in FIG. 3. This particular example shows a possible three-dimensional space (m=3). Various data points 70 are plotted, with each data point 70 representing a formed weld. Here, three features are used to create the three-dimensional space. As noted above, n candidate features can be used to produce a smaller m-dimensional space. Therefore, there may be a tradeoff between the number of extracted features and the resultant complexity of the processing steps undertaken by the mapping module 43 and CPU 47. Each dimension/axis x, y, and z shown in FIG. 5 corresponds to a separate feature, with the location of a given data point 70 described by its location with respect to each of the axes. No other spatial meaning is attributed to these particular designators. Also, the example shape of the void is non-limiting.

A data point 70 corresponding to the feature set of a given weld is mapped to a dimensional space, e.g., the space 60, by the mapping module 43 of FIG. 3. Thus, each data point 70 in the 3D space example of FIG. 5 is defined by a triplet [x, y, z] in the three-feature example of the same Figure. Using arbitrary designations for additional axes, a four-axis example could be defined by a set [x, y, z, q], etc. The mapping module 43 of FIG. 3 may access the recorded feature library 41, information stored in memory device 48, and/or may otherwise determine calibrated limits for each feature. The upper/lower limits define the boundaries of the dimensional space 60, e.g., the cube 71 or a less/more complex geometric shape in other embodiments mapping fewer/more than three features, respectively. It is also possible that each feature is bounded in only one direction, for instance having a lower limit with no upper limit or vice versa.

The host machine 40 and/or the learning machine 140 of FIG. 3 may also include the training library 44 noted briefly above. One may train the learning machine 140 to recognize good and suspect welds by preloading previously-validated good and suspect data points 70 (see FIG. 4). These data points 70 can also be used to set the boundaries of the dimensional space used by the mapping module 43. The feature library 41 may include all of the data points 70 of FIG. 5 in the training library 44, or only some of these points. For example, if the corresponding weld quality of certain data points 70 is not known but may be knowable over time given a sufficient number of additional similar samples, the data points 70 of unknown quality may continue to reside in the training library 44 for some time until they are validated. Once validated, a new data point 70 in the training library 44 may be used to update the boundaries of the dimensional space.

The monitoring system 13 shown in FIG. 3 may also include a quality prediction module 46. The quality prediction module 46 may be embodied as a set of computer-executable instructions, recorded in memory device 48 and executable via the CPU 47, for comparing the location of a given data point 70 to the limits or boundaries of the dimensional space, e.g., the example cube 71 of FIG. 5. If a data point 70 lies outside of the cube 71, the quality prediction module 46 of FIG. 3 may designate these data points 70 as corresponding to a suspect weld. Likewise, if a data point 70 lies within the cube 71 of FIG. 5 such as in the case of the data points 72, the quality prediction module 46 may designate this data point 70 as corresponding to a good weld.

As will be understood in the art, various tracking technologies exist which enable identification and tracking of a component as it moves through various production stages, for instance RFID tagging, such that the host machine 40 of FIGS. 1 and 3 may be informed as to the identity of the particular weld that is currently being formed. This allows the good/suspect status for each weld to be accurately tracked regardless of the number of welds formed before or after formation of that particular weld.

As noted above, the host machine 40 transmits a predicted quality output value (arrow 26) which captures the status of a weld as a collection of 0 or 1 decisions over time. Such a value may be output by the quality prediction module 46 described above. The output value (arrow 26) may be transmitted to a programmable logic controller (PLC) 58, with the good/suspect status viewable in real time by production operators via an associated human-machine interface (HMI) 17, or captured and recorded in a database 32. The PLC 58 is in two-way communication with the host machine 40, e.g., via a data bus (not shown). The HMI 17 may be a touch-screen display so as to facilitate direct user interaction with the host machine 40, the status projector 50, the display 59, and/or a camera 80 that executes image processing instructions 101, and that is in communication with the host machine 40 over a bus 36, or otherwise in communication with database 32.

The database 32 of FIG. 3 is shown as a single device for simplicity. However, the database 32 may be embodied as a distributed database management system. For instance, the database 32 may be embodied as a data server storing a calibrated number of signal files from the external sensor arrays 25, 125, 225 and/or the welding controller 20, a data acquisition/DAQ database, a structured query library/SQL database containing metadata and quality data for a calibrated time period, etc. Any data in the database 32 may be extracted by the host machine 40, as is indicated by double-headed arrow 39.

The host machine 40 of FIG. 3 may also transmit the output value 26 status to the status projector 50 and PLC 58. As described above, certain types of work pieces, such as an assembled battery module 230 shown schematically in FIG.

3, include a lengthy series of outwardly identical welds. These are collectively illustrated as a weld series 142. Each weld in the weld series 142 is typically manually inspected in a laborious picking process after weld formation, wherein the various welds are physically pulled or prodded with a picking tool to stress the weld and thus directly verify weld quality. Use of the status projector 50 may help minimize the amount of time spent and ergonomic stresses of manually picking welds in the battery module 230, and may facilitate or expedite the minimal picking of suspect welds that still occurs.

Specifically, the status projector 50 includes a processor 55. The projector 50 displays status information using one or more light beams (arrows 52) by projecting the light beams (arrows 52) onto a surface, for instance on or adjacent to the work piece 230 on or adjacent to suspect welds in the weld series 142. The status projector 50 may be embodied as a conventional light projector, or as a laser projector which projects concentrated or collimated beams of visible or other wavelengths of light as explained below.

The processor 55 receives the output value (arrow 26) from the PLC 58 and/or from the host machine 40. The output value (arrow 26) may include the associated identifying information such as the serial number of the battery module 230 and identifying information for each weld in the weld series 142. The processor 55 then projects a light beam(s) (arrows 52) onto or adjacent to a weld. Optionally, display 59 may be placed in communication with the PLC 58 and positioned with respect to the work piece 230, with text or other information (arrow 62) from the PLC 58 presented via the display 59, such as the weld status, serial number of the work piece 230, alert messages, status information, etc.

For instance, light beams (arrows 52) may be projected onto a portion of the example interconnecting member 45 of FIG. 2, or onto the weld 42 that is deemed to be suspect. The status projector 50, when configured as an optional laser projector, may use a red/green/blue (RGB) laser projector to project a specific color laser indicating the suspect welds, or a gas laser with a switched color filter. The color of the beam should provide sufficient contrast with the materials onto which the light beam 52 is directed, with optional mixing of the beams (arrows 52) enabling use of colors such as yellow, magenta, cyan, etc.

Using the light beams (arrows 52) in this manner, line operators may be visually queued to the suspect welds. Other embodiments may be conceived, such as coating work piece surfaces, such as the interconnecting member 45 of FIG. 2, with a fluorescent layer and using ultraviolet light rather than visible light as the light beams (arrows 52). Visible light is then emitted from the irradiated surfaces similar to approaches used in certain heads up display (HUD) systems.

An example of the present method 100 is shown in FIG. 6 for binary classification of an item of interest in a repeatable process, e.g., the example weld described herein during a vibration welding process. The method 100 may be embodied as computer-executable instructions that are executed by the host machine 40 and/or the learning machine 140 of FIG. 3 and other components of the monitoring system 13, with the host machine 40 ultimately monitoring weld quality in a welded assembly, e.g., the example battery module 130 of FIG. 2.

Beginning with step 102, the host machine 40 and/or learning machine 140 processes the control signals (arrow 24) and the external signals (arrows 28) of FIG. 1. Step 102 entails execution of learning aspects of the box-void methodology noted above. Details of the box-void methodology are described in more detail below with reference to FIGS. 7 and 8.

Referring briefly to FIG. 7, the learning machine 140 of FIG. 3 may conduct a learning subprocess 150 as part of step 102. When a learning machine 140 is not used, the host machine 40 may be used for learning purposes when the repeatable process is not being run. While FIG. 7 depicts steps of feature selection, rule determination, and performance evaluation serially, in practice these steps are linked together. That is, performance may affect the selection, which is known in the art is referred to as a "wrapper method".

A first external sensor 25, which is labeled as $S_1$ in FIG. 7 for clarity, through an $S^{th}$ sensor $S_n$, feed signals into the learning machine 140 of FIG. 3. Fe (Feature Extraction) involves extraction of features from the received signals and plotting of the features, e.g., as shown in FIGS. 4A-4B, against a suitable index such as time.

Feature Selection (Fs) includes selection of the m features having optimum predictive value relative to the other candidates. Given a feature set having a sufficient number of n candidate features, the learning machine 140 can identify the m features that most accurately correspond to failed welds. All other features can be discarded. For instance, if data shows that a given weld passes or fails regardless of how much the value of a particular feature varies, that feature has little predictive value. However, if bad welds are produced mainly when a particular feature varies from a range, that particular feature may have sufficient predictive value.

Rule Determination (Rd) includes determining which rule to apply, including building the box-void, e.g., box 171 of FIG. 4C. Once the box-void is generated, the learning machine 140 evaluates the performance of the box during the step of Performance Evaluation (Pe).

Step Pe may involve testing the predictive value of the box-void against sample welds, i.e., a set of relevant data not used in the learning process. Application of the rule to this data gives a more realistic assessment of the actual performance of the rule on the new data. If validated at step V, the defined box-void may be recorded in memory accessible by the host machine 40 of FIG. 3 at step (*), and the recorded box-void may be used thereafter in online monitoring of the repeatable process. Otherwise, some remedial action is taken at step (**), e.g., evaluating whether the learning data set is relevant to the current state of the process.

In using the subprocess 150 of FIG. 7, one iteration of the subprocess 150 considers all candidate features, with the "best" feature/tail combinations used to update the rule. Hence, a feature is selected and part of the rule is determined at each iteration. The rule is then applied to the training data, and points that are outside of the current void are removed from the training set. When the resulting data set contains no group 1 items, the rule is complete. The rule may be adjusted as needed to allow a small number of group 1 items, for instance no more than about 10 percent. This may also occur in real-time via the host machine 40 as a function of the type I and/or type II error rates. Otherwise, the rule is incomplete and another iteration is started. Once a feature is added to the rule at the end of an iteration, it remains in the rule, bit the bounds may change. Once the rule matrix has been determined, the method 100 of FIG. 6 resumes with step 104.

At step 104 of FIG. 6, the welding or other process is commenced. The defined box-void from step 102 are used to predict the quality state of the weld or other item of interest, with data points falling in the box-void predicted as being good (state 0).

At optional step 106, the predicted status may be optionally displayed on or adjacent to the welds of the work piece using the status projector 50, e.g., by projecting light beams (arrows 52) directly onto the welds from overhead or onto part of the interconnecting member 45 shown in FIG. 2. The light beams (arrows 52) can be used to visually highlight or indicate the positions of the suspect welds 42 directly on or adjacent to the welds 42. The method 100 then proceeds to step 18.

At optional step 108, an inspector may manually pick the welds 42 that are indicated as being suspect at step 108. The inspector may then record the locations of the welds 42 that are in fact unsatisfactory/bad, either as part of step 108 or by proceeding to optional step 110.

At optional step 110, the inspector may physically mark the confirmed bad welds from step 110. Step 112 may entail physically placing stickers, imprints, paint, or any other suitable marker. The marker may be placed over or next to a confirmed unsatisfactory weld. As accurate identification of the weld locations is essential, the markers used in step 112 should be designed in such a way that the position of the placed marker can be readily and accurately determined via operation of the camera 80 and the image processing instructions 101, even under varying lighting conditions. Likewise, the work piece, e.g., a battery section, should be located consistently in the field of view (arrow 53) of the camera 80 to ensure that the locations of the welds are determined accurately. Alternatively, additional visual locating features can be added to the battery section to make locating of the part more accurate for the image processing instructions 101. The method 100 then proceeds to optional step 112.

At optional step 112, the camera 80 of FIG. 3 may be used to image any marked bad welds 42 by executing the instructions 101. The captured images of the confirmed bad welds are processed by executing the instructions 101. Processing may include identifying the locations in or on the work piece of each confirmed bad weld, e.g., by comparing the location of the imaged markers to a baseline/calibrated image or using other position or pattern recognition techniques. The locations of the unsatisfactory welds may be recorded in the database 32 for use by a repair technician in a subsequent repair operation.

The repair technician may be restricted to updating of the repair status only of the unsatisfactory welds. For instance, the HMI 17 of the PLC 58 or another HMI may display the unsatisfactory weld locations and/or images of these welds instead of displaying all of the welds and allowing the technician to pick from a list of all welds. Given the number of welds in the weld series 142, restriction of data entry to only confirmed unsatisfactory welds may reduce errors, such as by selecting the wrong weld location from a global list. If other positions require data entry, a warning message may be given to the repair person requesting manual confirmation of the position.

Communication may be made with the PLC 58 to indentify when a particular weld 42 has been identified for repair. Any such image displayed on the HMI 17 or other display should be taken such that buttons on the touch screen of HMI 17 properly with the location of weld positions in the image. This alignment can help ensure that image processing software of projector 50 or another device can confirm that the inspector/repair person is selecting the correct weld position when entering data on bad welds.

Implementation

Referring to FIG. 8, subsubprocess 200 provides one possible way to implement the rule determination (step Rd) of FIG. 7. The subsubprocess 200 finds, for each candidate feature, the tail and the boundary/boundaries that optimizes a criterion function that in turn quantifies the suitability of features of interest and a tail for item classification, for instance the binary classification of a weld into a good (1) or bad (0) state. This information for a feature is captured by (j, k, b, m), where column j is the index of a data matrix F for the $j^{th}$ feature, k=1 for the lower tail and 2 for the upper tail, b is the corresponding boundary, and M is the figure of merit, i.e., the value of the criterion function. A similar entity stores the information for the feature of merit and tail with the current best figure of merit.

Beginning with step 201, the learning machine 140 of FIG. 3 initializes. As part of step 201, the value of j is set to 0. The rule matrix is empty. The current best feature, which is described by (j, k, b, M), is also empty. The subprocess 200 proceeds to step 203 upon completion of step 201.

At step 203, the learning machine 140 counts the number ($n_0$) of items with a label 0, and likewise counts the number ($n_1$) of items with a label of 1. Once this step is finished, the subprocess 200 proceeds to step 205.

Step 205 entails determining whether the result of step 203 is $n_1$=0. If so, the rule is known for that feature, and the process is complete. If $n_1 \neq 0$, the subprocess 200 proceeds to step 207.

At step 207, the learning machine 140 increments j, i.e., the column index of F, by 1 and proceeds to step 209.

At step 209, the learning machine 140 next organizes the data of the $j^{th}$ feature from smallest to largest while carrying along the labels 0 or 1 for each data point, then proceeds to step 211.

Step 211 includes determining or identifying, via the learning machine 140, the first and last group 1 ordered runs for the organized $j^{th}$ feature from step 209. The subsubprocess 200 proceeds to step 213 once these ordered runs have been identified.

Step 213 includes finding the midpoint between the last value in the first group 1 ordered run from step 211 and the next adjacent value. This step defines the cutoff or bound $b_L$ for the lower tail in the distribution. Similarly, the host machine 40 can find the midpoint between the first value and the last group 1 ordered run and the preceding adjacent value. This defines the cutoff or boundary $b_U$ for the upper tail in the distribution. The subprocess 200 then proceeds to step 215.

At step 215, the learning machine 140 next computes the following:

$$n_{1,L} = \#\{x_i \leq b_L, l_i=1\} \quad n_{0,L} = \#\{x_i > b_L, l_i=0\}$$

$$n_{1,U} = \#\{x_i > b_U, l_i=1\} \quad n_{0,U} = \#\{x_i < b_U, l_i=0\}$$

where the number (#) is the number of $x_i$ less than or equal to the lower bound $b_L$.

After completing step 215, the learning machine 140 computes, at step 217, a figure of merit for each tail of the distribution. One possible figure of merit is the product of the proportion of group 1 points in the tail with the proportion of group 0 points in the rest of the distribution. Thus, $$m_L = \frac{n_{0,L}}{n_0} \frac{n_{1,L}}{n_1}$$

for the lower tail, and $$m_U = \frac{n_{1,U}}{n_1} \frac{n_{0,U}}{n_0}$$

for the upper tail. In this instance, a larger proportion is better. The subprocess 200 then proceeds to step 219.

At step 219, for the feature j, the learning machine 140 retains the tail and the boundary with the larger figure of merit. That is, (j, 1, $b_L$, $m_L$) is retained if $m_L \geq m_U$. Otherwise, the learning machine 140 retains (j, 2, $b_U$, $m_U$).

At step 221, the learning machine 140 next determines whether the figure of merit for feature j from step 219 exceeds the current best figure of merit. If so, the subprocess 200 saves the value from step 219 at step 223. Otherwise, the subprocess 200 proceeds to step 227.

At step 227, the learning machine 140 considers whether all features have been considered such that j=n. If so, the subprocess 200 proceeds to step 229. Otherwise, the subprocess 200 returns to step 207.

At step 229, the learning machine 140 adds the current "best" feature to the rule matrix, i.e., places the value of b into the column k of the row in the rule matrix corresponding to the $j^{th}$ feature, if the feature is new to the rule, or overwrites the previous value if the feature is already in the rule matrix. Additionally, the learning machine 140 removes from F all rows corresponding to data with a feature value outside of the limits given in the rule, and also removes the corresponding elements from l. j is then set to 0, and the subprocess 200 returns to step 203.

As noted above, the present approach can be used to classify welds into one binary state or another in real time. The box-void method 100 automatically determines the best features, which in one embodiment may be determined from a set of known features. For instance, the learning machine 140 of FIG. 3 may be provided with features F1-F5, and the learning machine 140 can use the subprocess 200 of FIG. 8 to identify those features having the best predictive value relative to the others.

Figure 9:
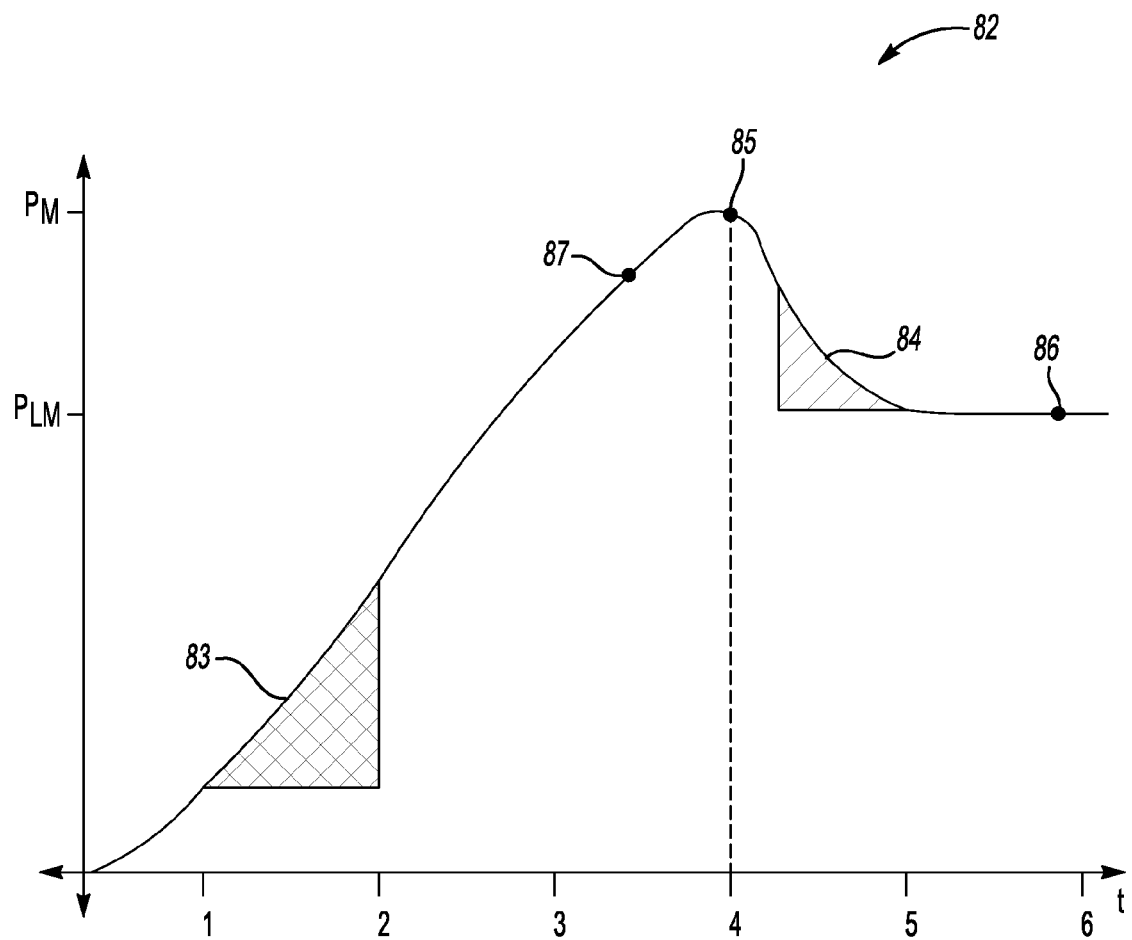
FIG. 9 is an example power curve for the welding system of FIG. 1.

Referring to FIG. 9, as will be appreciated by one of ordinary skill in the art after reading the above disclosure, the present approach can also be used to identify features from one or more candidate features. For example, a power curve 82 is shown that plots the changing welding power (P) over time (t) during formation of a weld. Each weld has an associated power curve, with the weld being formed over a short duration, perhaps 0.5 s. Within this power curve 82, each point in time has a corresponding value on the power curve 82. The power curve 82 has a peak value $P_M$ at point 85, at around t=4, and a local minimum value ($P_{LM}$) at point 86, which occurs at about t=6.

While one could identify a feature defined as, for example, the point 87 at t=3, the choice of which features to use can be made by the host machine 40 using the subprocess 200. A human choice may be arbitrary, e.g., point 85 to correspond to the peak power. Such a value is frequently used in conventional closed-loop threshold comparison control approaches, such as by comparing the peak value ($P_M$) to a maximum and minimum allowable value. However, it is recognized herein that point 85 may not predict the resultant weld quality as well as other points. Likewise, one could manually select the slope 83 between t=1 and t=2 as a feature. In fact, slope 84 between points t=4 and t=5 may be more predictive of the resultant quality.

Thus, the rule determination function of the box-void method 100 can be used to scan every point, or every slope, in the power curve 82 of FIG. 9 for the best points and/or slopes in this example. Once identified, these points and/or slopes may be used as candidate features. The approach is the same to the learning machine 140. The only change that is necessary to the method 100 described above is to configure learning machine 140 to receive instructions to break a particular value, such as but not limited to the example power curve 82 of FIG. 9, into as many different subcomponents as is practicable. The limits on this optional approach lie, for the most part, in the limits in available time and processing power.

Other values could be used to find candidate features, such as the area under the curve between different combinations of the possible points.

The box-void method 100 described above is not limited to use in welding. The quality of any item that is both measurable and quantifiable in a binary manner can be evaluated as set forth herein. Examples include the health of any system component, whether inanimate or a living being, provided the functions or processes of the monitored system are repeatable.

While the best modes for carrying out the invention have been described in detail, those familiar with the art to which this invention relates will recognize various alternative designs and embodiments for practicing the invention within the scope of the appended claims.

The invention claimed is:

1. A system comprising:
a welding horn;
an anvil positioned adjacent to the welding horn, wherein the welding horn is configured to clamp against the anvil and form a weld on a work piece during a repeatable vibration welding process;
a plurality of sensors positioned with respect to the welding horn;
a host machine and a learning machine each having a respective processor in electrical communication with the plurality of sensors; and
tangible, non-transitory memory on which is recorded instructions for predicting a binary quality status of the welds formed via the vibration welding process, wherein the binary quality status includes only a passing binary class and a failing binary class, and wherein the learning machine is configured to execute the instructions via the processor to thereby:
receive signals from the plurality of sensors;
identify a set of candidate features as a function of the received signals;
extract a plurality of features from the identified set of candidate features, each of which is more predictive of the binary quality status of the welds relative to all non-extracted features in the identified set of candidate features;
map the extracted plurality of features to a dimensional space having a number of dimensions that is proportional to a number of the extracted features, wherein the dimensional space includes most of the welds from the passing binary class in the dimensional space and exclude at least 90% of the welds from the failing binary class; and
record the dimensional space in the memory;
wherein the host machine is configured to compare the received signals for a subsequent weld to boundaries of the recorded dimensional space during the repeatable vibration welding process to thereby predict, in real time, the binary quality status of the subsequent weld.

2. The system of claim 1, wherein the plurality of sensors includes an acoustic sensor, and wherein the extracted plurality of features includes an acoustical value.

3. The system of claim 1, wherein the extracted plurality of features includes a slope between points in time of a power curve describing power consumed by the welding horn during formation of the weld.

4. The system of claim 1, further comprising a status projector, wherein the host machine is configured to indicate the predicted binary quality status on or adjacent to the welds by activating the status projector.

5. The system of claim 4, wherein the work piece is a battery pack having an interconnecting member to which tabs of different battery cells are welded, and wherein the status projector indicates the predicted binary quality status directly on the interconnecting member.

6. The system of claim 1, wherein the host machine is further configured to automatically create a rule matrix having multiple rows, with one row designated for each of the extracted features, and wherein the rule matrix defines at least one of an upper and a lower boundary for each row in the matrix.

7. The system of claim 1, wherein the host machine is configured to determine an error rate during the repeatable process, and to automatically increase or reduce a size of the dimensional space as a function of the error rate.

8. The system of claim 1, wherein the host machine is configured to map the extracted features by finding, for each feature, a tail and a boundary that optimizes a criterion function which in turn quantifies a suitability of the feature and the tail for classification into one of the passing and the failing binary classes.

9. A method for use in a welding system having a welding horn, an anvil positioned adjacent to the welding horn, wherein the welding horn is configured to clamp against the anvil and form a weld on a work piece during a repeatable vibration welding process, a plurality of sensors positioned with respect to the welding horn, and a host machine and a learning machine each having a respective processor in electrical communication with the sensors, the method comprising:

deriving, via the learning machine, a set of candidate features from a set of sensory from the sensors and control signals from the welding controller;

extracting, via the learning machine, a plurality of features from the set of candidate features, wherein each extracted feature is more predictive of a known quality of a weld in a library of training welds than all non-extracted candidate features in the set of candidate features;

mapping the extracted features to a dimensional space having a number of dimensions that is proportional to a number of the extracted features, wherein the dimensional space includes most of the items of interest from a passing binary class and excludes at least 90 percent of the items of interest from a failing binary class;

recording the dimensional space;

receiving, via the host machine, the control signals from the welding controller during a vibration welding process, wherein the control signals cause the welding horn to vibrate at a calibrated frequency; and predicting a binary quality status of subsequent welds in real time during the vibration welding process, via the host machine, including measuring the extracted features in real time using the sensors and comparing the extracted features to boundaries of the recorded dimensional space;

wherein an extracted feature falling within and outside of the dimensional space is assigned a failing and a passing binary classification, respectively, corresponding to the respective failing binary class and passing binary class.

10. The method of claim 9, further comprising:

determining an error rate during the repeatable process; and automatically increasing or reducing a size of the dimensional space as a function of the error rate.

11. The method of claim 9, wherein displaying the predicted binary quality status includes indicating the predicted binary quality status directly on or adjacent to the weld via a status projector.

12. The method of claim 9, further comprising automatically creating and recording, via the learning machine, a rule matrix having multiple rows, with one row designated for each of the extracted features, wherein the rule matrix defines at least one of an upper and a lower boundary for each row in the matrix.

13. The method of claim 9, wherein mapping the extracted features includes finding, for each feature, a tail and a boundary that optimizes a criterion function which quantifies the suitability of the feature and the tail for classification into one of the passing and the failing binary classes.

* * * * *